(12) United States Patent
Ishii

(10) Patent No.: US 6,552,845 B2
(45) Date of Patent: Apr. 22, 2003

(54) OPTICAL GAIN EQUALIZER AND OPTICAL FIBER TRANSMISSION LINE

(75) Inventor: Satoshi Ishii, Minato-ku (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 10/011,658

(22) Filed: Oct. 30, 2001

(65) Prior Publication Data

US 2002/0054426 A1 May 9, 2002

Related U.S. Application Data

(63) Continuation of application No. 09/330,304, filed on Jun. 11, 1999, now abandoned.

(30) Foreign Application Priority Data

Jun. 15, 1998 (JP) .......................................... 10-166963

(51) Int. Cl.$^7$ .............................................. H01S 03/00
(52) U.S. Cl. .................................................. 359/337.1
(58) Field of Search ........................... 359/337.1, 337.4, 359/161

(56) References Cited

U.S. PATENT DOCUMENTS

| | | | | |
|---|---|---|---|---|
| 5,900,970 A | * | 5/1999 | Kakui | 359/341 |
| 5,912,750 A | * | 6/1999 | Takeda et al. | 359/124 |
| 5,933,552 A | * | 8/1999 | Fukushima et al. | 385/24 |
| 6,151,158 A | | 11/2000 | Takeda et al. | 359/341 |
| 6,400,496 B1 | * | 6/2002 | Epworth | 359/337.1 |

FOREIGN PATENT DOCUMENTS

| | | |
|---|---|---|
| JP | 59-48508 | 3/1984 |
| JP | 3-44206 | 2/1991 |
| JP | 3-196125 | 8/1991 |
| JP | 4-147114 | 5/1992 |
| JP | 4-269726 | 9/1992 |
| JP | 6-276154 | 9/1994 |
| JP | 8-223136 | 8/1996 |
| JP | 8-240822 | 9/1996 |
| JP | 9-244079 | 9/1997 |
| JP | 9-258117 | 10/1997 |
| JP | 9-289348 | 11/1997 |
| JP | 9-289349 | 11/1997 |
| JP | 2000004061 A | * 1/2000 |
| JP | 0200020916 A | * 7/2000 |

* cited by examiner

Primary Examiner—Mark Hellner
(74) Attorney, Agent, or Firm—Dickstein, Shapiro, Morin & Oshinsky, LLP.

(57) ABSTRACT

Disclosed is an optical gain equalizer for equalizing optical powers for a plurality of signal lights having wavelength different from one another. Disclosed are also an optical transmission line and an optical wavelength multiplex transmission system, for which the optical gain equalizer is used. The optical gain equalizer has a characteristic where a loss is monotonously changed in a signal wavelength band. A characteristic of a monotonous reduction of loss from a short wavelength to a long wavelength and/or a characteristic of a monotonous increase of loss from a short wavelength to a long wavelength is utilized. Specifically, the optical gain equalizer is composed of a well-known optical element such as an optical etalon filter, an optical band-pass filter, an optical fiber grating or the like. Even if a loss varies on the optical transmission line, the optical gain equalizer can provide an uniform optical power for respective channels.

8 Claims, 9 Drawing Sheets

OPTICAL GAIN EQUALIZER AND OPTICAL FIBER TRANSMISSION LINE

CROSS-REFERENCE TO RELATED APPLICATIONS

This is a continuation of U.S. patent application Ser. No. 09/330,304, filed Jun. 11, 1999 now abandoned in the name of Satoshi Ishii and entitled "OPTICAL GAIN EQUALIZER AND OPTICAL FIBER TRANSMISSION LINE."

BACKGROUND OF THE INVENTION

1. Field of the Invention

The present invention relates to an optical fiber transmission line. More specifically, the invention relates to an optical fiber transmission line provided with an optical gain equalizer, and the optical gain equalizer thereof.

2. Description of the Related Art

In order to transmit a signal light through a long distance, an optical wavelength multiplex transmission system comprises an optical fiber amplifier which is arranged in an optical repeater on an optical fiber transmission path to directly amplify the signal light. The optical fiber amplifier includes a rare earth doped optical fiber, an excitation light source, and an optical coupler for supplying a light from the excitation light source to the rare earth doped optical fiber. As an amplification characteristic (gain) of the optical fiber amplifier depends on a wavelength of an incident signal light, many optical gain equalizers and optical gain equalizing methods have been presented to compensate for such wavelength dependency [e.g., Unexamined Patent Publication Laid-Open No. 4 (1992)-269726, Unexamined Patent Publication Laid-Open No. 6 (1994)-276154, Unexamined Patent Publication No. 8 (1996)-223136, Unexamined Patent Publication No. 3 (1991)-44206]. Usually, the optical repeater includes an optical fiber amplifier and an optical gain equalizer. A gain characteristic of such an optical fiber amplifier in a signal wavelength band is represented by an upward convex curve with respect to a wavelength of a signal light. In other words, a gain in a middle wavelength in the signal wavelength band is large. On the other hand, a loss characteristic of the optical gain equalizer with respect to an optical wavelength is represented by a downward convex curve with respect to a wavelength of a signal light. In other words, a loss in a middle wavelength in the signal wavelength band is large. The gain characteristic of the optical fiber amplifier and the loss characteristic of the optical gain equalizer cause a gain characteristic of the optical repeater in the signal wavelength band to be flat.

The optical wavelength multiplex transmission system comprises a plurality of optical repeaters, which are arranged at specified distances on the optical fiber transmission line for connecting an optical transmission equipment and an optical receiving equipment with each other. In the case of the optical repeater provided with the optical gain equalizer, a gain with respect to a signal light of the optical power set at the time of designing is flat. Accordingly, optical signals of respective channels of a wavelength multiplexed signal light are propagated through the optical fiber transmission line, each having an optical power equal to one another.

In the actual optical multiplex transmission system, however, losses on the optical fiber transmission line are not uniform but varied widely. Thus, there is large variance of optical power among signal lights entering the respective optical repeaters. On the other hand, when a signal light of an optical power different from a design value enters the optical repeater, a gain of the optical repeater in the signal wavelength band is monotonously reduced or increased with respect to a wavelength of the signal light. Specifically, if a power of a signal light entering the optical repeater is smaller than a specified optical power, a gain of the optical repeater is monotonously reduced from a short wavelength to a long wavelength. Conversely, if a power of an signal light entering the optical repeater is larger than the specified optical power, a gain of the optical repeater is monotonously increased from a short wavelength to a long wavelength.

If a loss on the optical fiber transmission line is larger than the design value, an input power of a signal light entering the optical repeater is smaller than the design value. Consequently, a wavelength gain of the optical repeater shows a characteristic of a monotonous reduction to a long wavelength side in the wavelength band, and a power of a signal light having a shortest wavelength is larger than an optical power of a signal light having a longest wavelength. Similarly, if a loss on the optical fiber transmission line is smaller than the design value, an input power of a signal light entering the optical repeater is larger than the design value. Consequently, the wavelength gain of the optical repeater shows a characteristic of a monotonous increase to a long wavelength side in the signal wavelength band, and a power of a signal light having a shortest wavelength is smaller than an optical power of a signal light having a longest wavelength.

Thus, even if the optical gain equalizer is installed in the optical repeater to compensate for the gain characteristic of the light amplifier, it is difficult to equalize gains in the entire optical multiplex transmission system.

SUMMARY OF THE INVENTION

An object of the present invention is to equalize gains on an entire optical transmission line so as to provide an equal power for each of signal lights, even if an optical power of a signal light entering an optical repeater is deviated from a design value because of loss variance or the like of an optical fiber.

In order to achieve the foregoing object, an optical gain equalizer of the present invention has a characteristic of a monotonous change of loss in a signal wavelength band. This loss may be divided into characteristics of a monotonous reduction from a short wavelength to a long wavelength, and a monotonous increase from a short wavelength to a long wavelength. Specifically, the optical gain equalizer may be composed of a well-known optical element such as an optical etalon filter, an optical band-pass filter, an optical fiber grating or the like. An optical fiber transmission line of the present invention includes such optical gain equalizers arranged at specified intervals. An optical wavelength multiplex transmission system of the present invention comprises an optical transmission equipment for sending out a wavelength multiplexed signal light, an optical receiving equipment for receiving the wavelength multiplexed signal light by separating a wavelength of the same, and the foregoing optical fiber transmission line arranged therebetween.

According to the present invention, even if a power of a signal light entering an optical repeater is changed because of loss variance of the optical fiber, signal lights reach the optical receiving equipment, each having a power equal to one another.

BRIEF DESCRIPTION OF THE DRAWINGS

The above and other objects, features and advantages of the present invention will become apparent from the following detailed description when taken with the accompanying drawing in which.

DETAILED DESCRIPTION OF THE PREFERRED EMBODIMENTS

Figure 1:
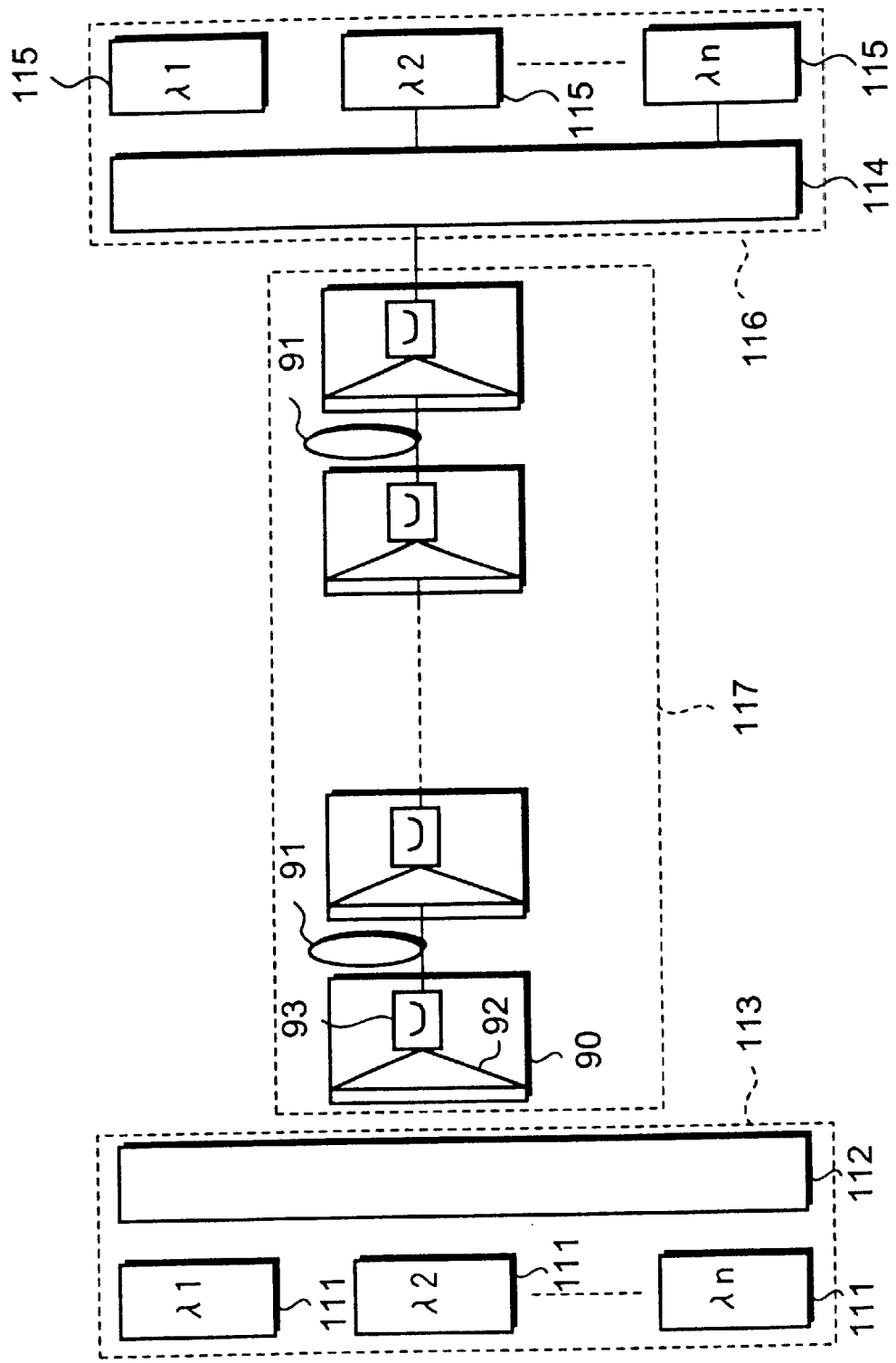
FIG. 1 is a block diagram showing a wavelength multiplex transmission system.

FIG. 1 illustrates a conventional optical wavelength multiplex transmission system using an optical repeater 90. This optical wavelength multiplex transmission system comprises an optical transmission equipment 113, an optical transmission line 117 and an optical receiving equipment 116. The optical transmission equipment 113 includes optical signal sources 111 which amount to n in number and generate optical signals (λ1, λ2, ... λn) having wavelengths different from one another and amounting to n in number, and an optical multiplexer 112 which multiplexes optical signals from these optical signal sources 111 and sends the multiplexed optical signals to an optical fiber transmission path. The optical receiving equipment 116 includes an optical demultiplexer 114 which demultiplexes the multiplexed optical signals for respective wavelengths, and an optical receiver 115 which receives the demultiplexed optical signals for respective wavelengths. A plurality of optical repeaters 90 are arranged at specified distances on the optical transmission line 117 laid between the optical transmission equipment 113 and the optical receiving equipment 116. In such a system, amplification characteristics of the optical repeaters 90 are designed to be equal in any signal light wavelengths. If a signal light having a power equal to a design value enters the optical repeaters, signal lights of respective channels are propagated, each having a power equal to one another.

Figure 2:
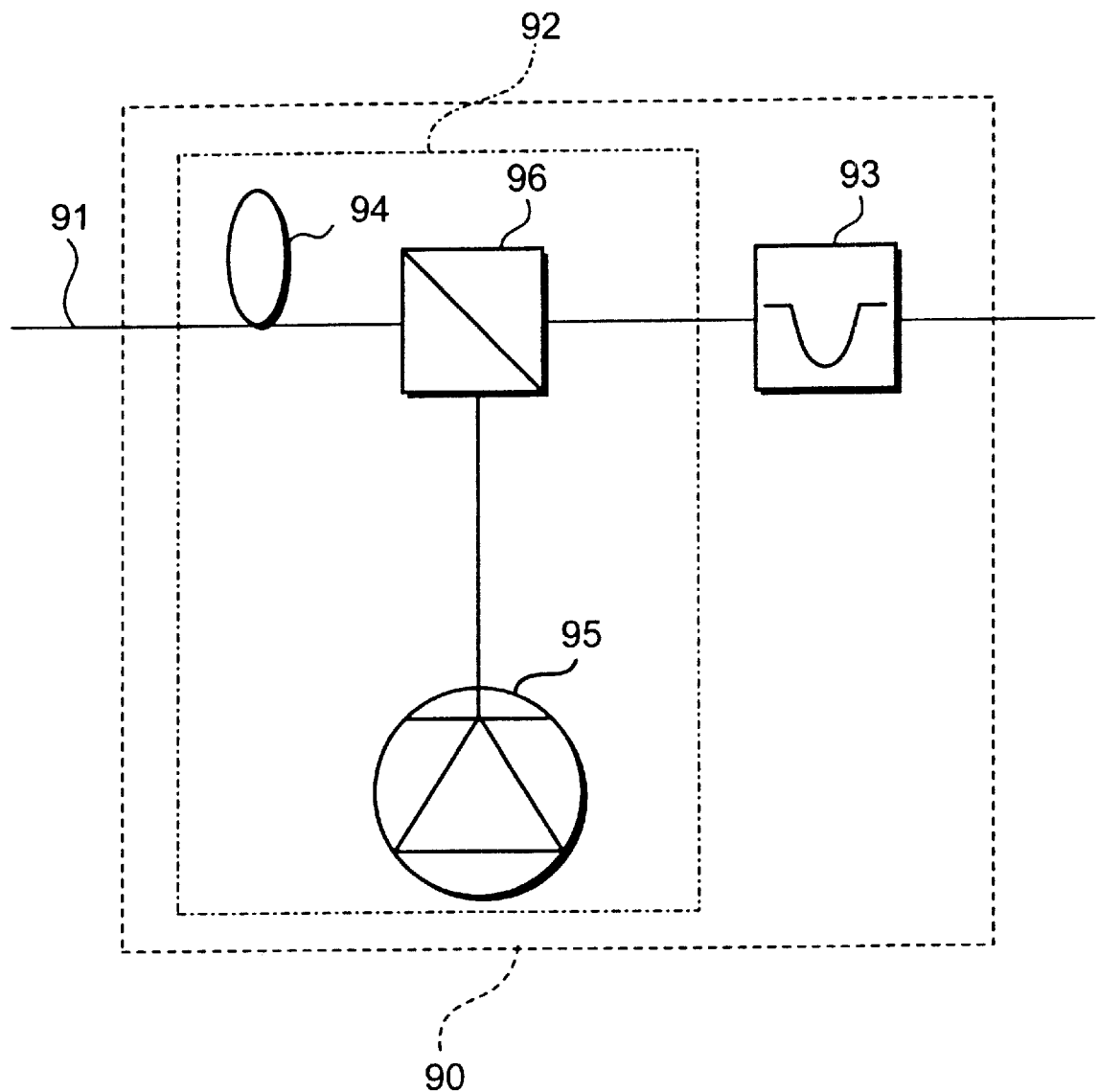
FIG. 2 is a block diagram of an optical repeater.
Figure 3A:
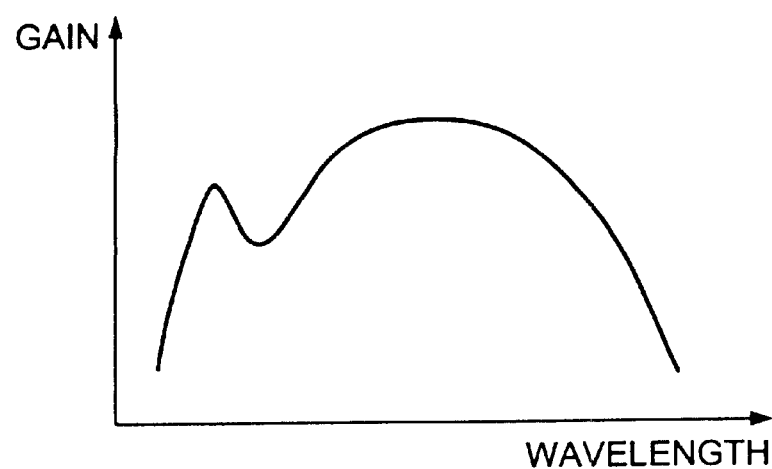
FIGS. 3A, 3B and 3C are graphs respectively showing an amplification gain characteristic of a light amplifier, a loss characteristic of an optical gain equalizer, and an overall amplification gain characteristic of the optical repeater.
Figure 3B:
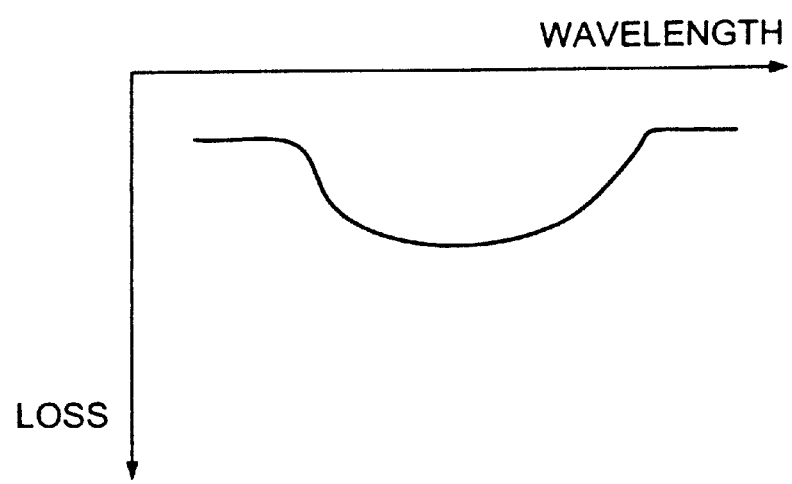
Figure 3C:
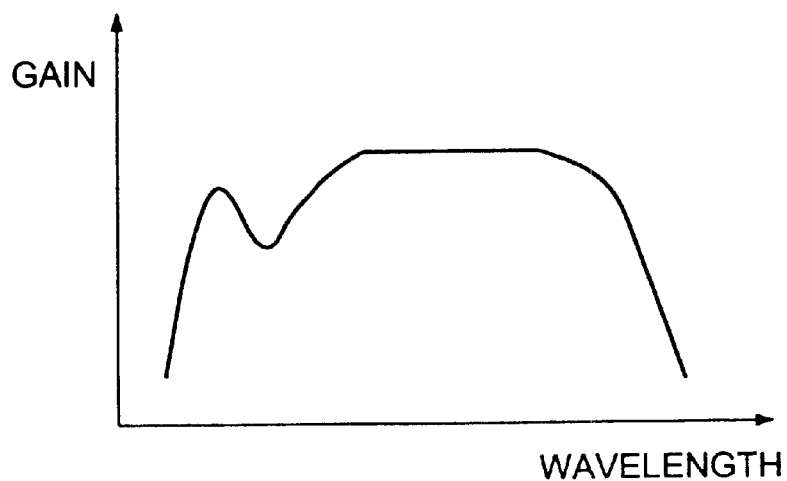

FIG. 2 illustrates an optical repeater 90, which includes a light amplifier 92 connected to an optical fiber transmission line 91, and an optical gain equalizer 93 connected to the light amplifier 92. The light amplifier 92 includes a rare earth doped optical fiber 94, an excitation light source 95, and an optical coupler 96 which supplies a light from the excitation light source 95 to the rare earth doped optical fiber 94. In the optical repeater 90, as shown in FIG. 3A, a gain characteristic of the light amplifier 92 with respect to a light wavelength is an upward convex curve with respect to a wavelength of an inputted signal light. On the other hand, as shown in FIG. 3C, a loss characteristic of the optical gain equalizer 93 in a signal wavelength band is a convex curve. This curve indicates that a loss in a light of a middle wavelength in the signal wavelength band is large. As a result, as shown in FIG. 3C, a gain of the optical repeater 90 is flat in the signal wavelength band.

Figure 4:
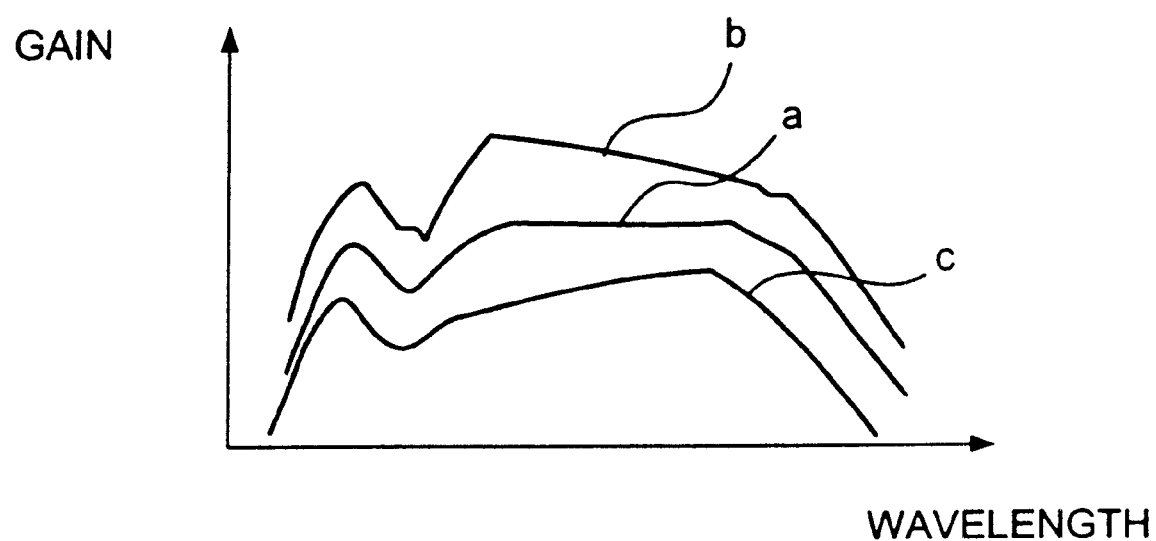
FIG. 4 is a graph showing a gain characteristic of the optical repeater.
Figure 5A:
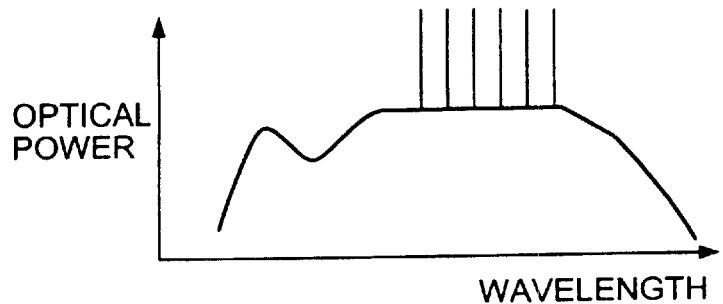
FIGS. 5A, 5B and 5C are optical spectra of respective cases where a loss on an optical fiber transmission path is equal to a design value, a loss is larger than the design value, and a loss is smaller than the design value.
Figure 5B:
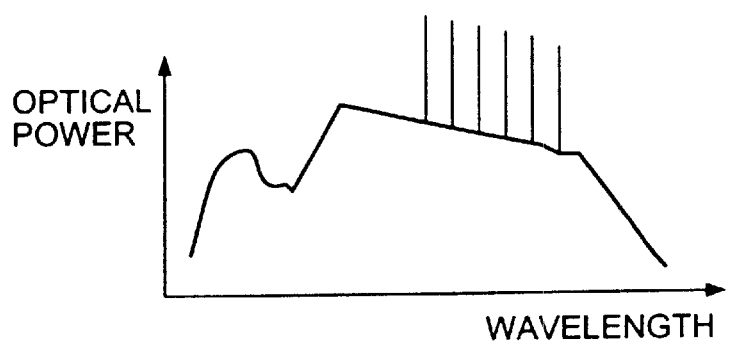
Figure 5C:
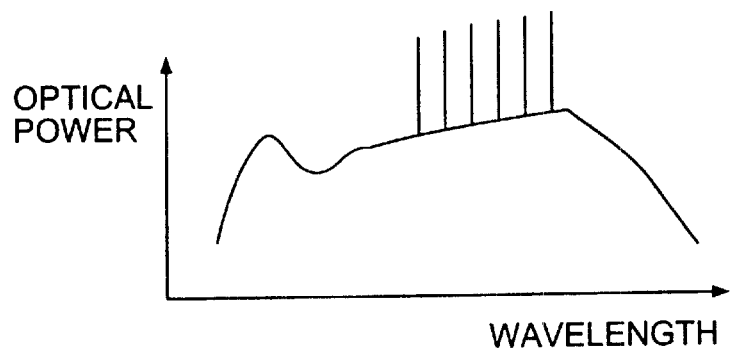

FIG. 4 shows a gain wavelength characteristic of the optical repeater. When an incident signal light has a specified optical power, a gain wavelength characteristic shows a flat characteristic (curve a). However, when a signal light having a small optical power enters the optical repeater, a gain wavelength characteristic shows a characteristic of a monotonous reduction from a short wavelength side to a long wavelength side (curve b). When a signal light having a large optical power enters the optical repeater, a gain wavelength characteristic shows a monotonous reduction from a short wavelength side to a long wavelength side (curve c). Accordingly, when a wavelength multiplexed signal light having an optical power equal to a design value enters the optical repeater, an optical spectrum is like that shown in FIG. 5A. When optical power is smaller than the design value, an optical spectrum is like that shown in FIG. 5B. When optical power is larger than the design value, an optical spectrum is like that shown in FIG. 5C.

Figure 6:
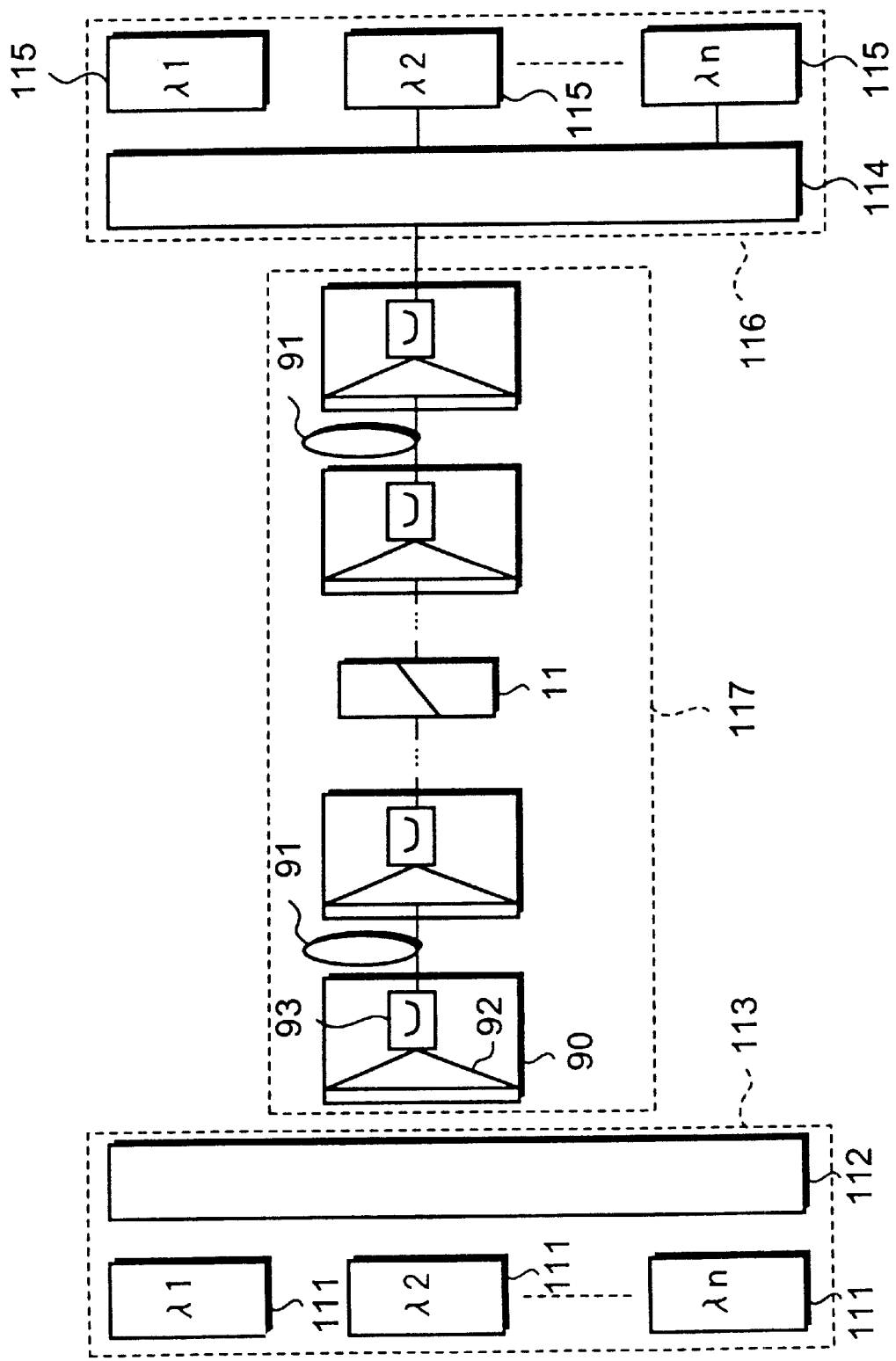
FIG. 6 is a block diagram showing an optical wavelength multiplex transmission system of the present invention.

FIG. 6 shows an example of an optical wavelength multiplex transmission system of the present invention. The configuration of this system is basically the same as that shown in FIG. 1. A difference is that an optical fiber transmission line 117 includes a gain equalizer 11 which has a characteristic of a monotonous change of loss in a signal wavelength band. One gain equalizer 11 is installed for a specified number of optical repeaters. For the gain equalizer 11, an optical etalon filter, an optical band-pass filter, an optical fiber grating or the like can be used.

Next, description will be made of an operation of the foregoing optical wavelength multiplex transmission system. In the optical transmission equipment 113, signal lights sent from the optical signal sources 111 are multiplexed by the optical multiplexer 112, and then an optical wavelength multiplexed signal containing signal lights of n channels is generated. The optical wavelength multiplexed signal enters the optical transmission line 117. The wavelength multiplexed signal light is propagated through the optical fiber transmission line 91, and gradually attenuated while being propagated. Then, the wavelength multiplexed signal light attenuated on the optical fiber transmission path enters the optical repeater 90. In the optical repeater 90, the light amplifier 92 amplifies the wavelength multiplexed signal light. Since gains of the light amplifier 92 are different for respective wavelengths, the amplified optical wavelength multiplexed signal has different powers for channels. In order to cancel power differences among the channels, the optical repeater 90 includes an optical gain equalizer 93 which is installed immediately after the light amplifier 92. The optical gain equalizer 93 performs correction to provide an uniform power for lights of all the channels amplified by the light amplifier 92.

However, a loss on the optical fiber transmission line 91 varies from transmission path to transmission line. For example, if a loss on a certain optical fiber transmission path 91 is larger than a design value, an inputted optical power of a wavelength multiplexed signal light entering the light amplifier 92 of the optical repeater 90 connected to this optical fiber transmission line 91 is smaller than the design value. As a result, the optical power of the wavelength multiplexed signal light amplified by the light amplifier 92 thereof is monotonously reduced from a short wavelength side to a long wavelength side. If an optical power difference between a shortest wavelength signal light and a longest wavelength signal light contained in an optical wavelength multiplexed signal after amplification in one optical repeater is 0.1 dB, a difference reaches 3 dB in an optical transmission system provided with thirty optical repeaters. Consequently, in the case of a short-wave side channel of a large optical power, a desired receiving state may not be obtained because of a nonlinear effect. In the case of a long-wave side channel of a small optical power, a desired receiving state may not be obtained because of a deteriorated signal-noise ratio.

In order to deal with such a situation, each of a specified number of optical repeaters is provided with an inclination correction gain equalizer 11 arranged on the optical transmission line 117. This inclination correction gain equalizer 11 is designed to bring about a monotonous increase of loss with respect to a wavelength. To deal with a case where a loss on the optical fiber transmission line 91 is smaller than the design value, an inclination correction gain equalizer 11 is arranged on the optical transmission line so as to bring about a monotonous reduction of loss with respect to a wavelength. This inclination correction gain equalizer 11 is installed on the optical transmission line in the following manner. When an optical fiber cable is laid, an optical power difference is measured between a shortest wavelength signal light and a longest wavelength signal light contained in an optical wavelength multiplexed signal in a specified position on the optical transmission line. Then, an inclination correction gain equalizer which has loss inclination suited for compensating for the optical power difference is installed in the measuring point. Proper arrangement of the inclination correction gain equalizer on the optical transmission line provides an uniform power for signal lights of all the channels when a wavelength multiplexed signal light enters the optical receiving equipment 116.

Figure 7A:
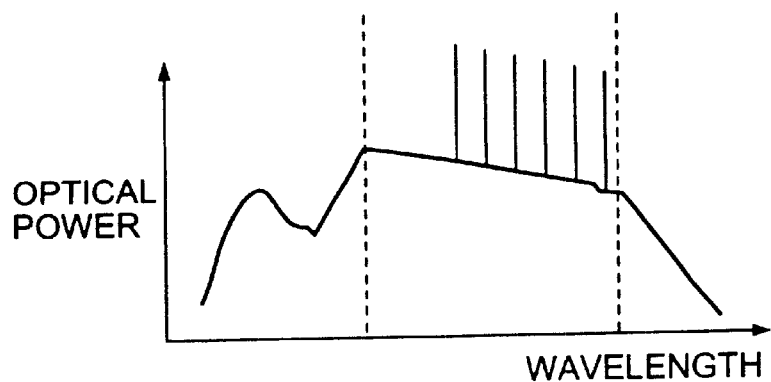
FIGS. 7A, 7B and 7C are respectively an optical spectrum of an inputted signal light when a loss on the optical fiber transmission path is larger than a design value, a loss characteristic view of a gain equalizer (etalon filter) and an optical spectrum of an outputted light of the gain equalizer.
Figure 7B:
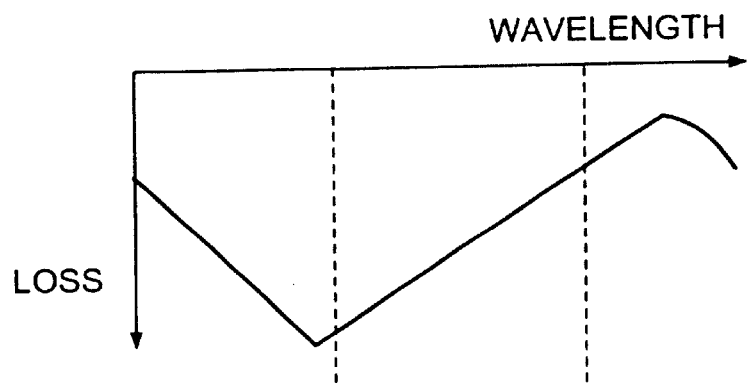
Figure 7C:
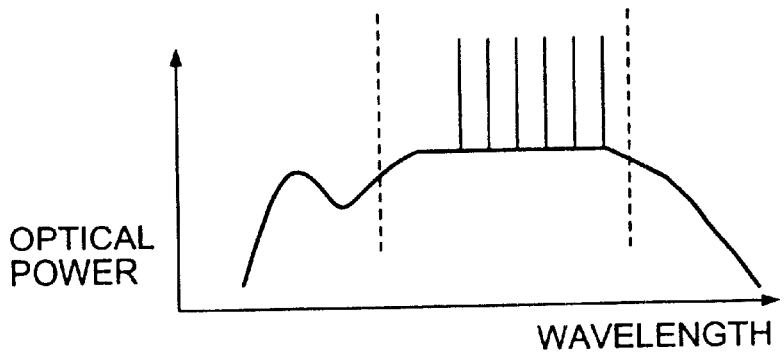

Description will now be made of an operation of the inclination correction gain equalizer 11 by referring to FIGS. 7A, 7B and 7C. If a loss on the optical fiber transmission line 91 is larger than the design value, an optical power of an optical wavelength multiplexed signal from the optical repeater is monotonously reduced as shown in FIG. 7A. In this case, for example, an etalon filter which has a loss wavelength characteristic like that shown in FIG. 7B is used as an inclination correction gain equalizer 11. Loss wavelength dependency of the etalon filter is cyclical. For the inclination correction gain equalizer 11, this fact necessitates use of an etalon filter, half of whose loss cycle is longer than a signal wavelength band. Also, the wavelength of the etalon filter where the maximum loss is generated is set to a shorter wavelength than that in the signal wavelength band, and the wavelength of the etalon filter where the minimum loss is generated is set to a longer wavelength than that in the signal wavelength band. With the etalon filter designed in the above manner, an inclination correction gain equalizer 11 having a characteristic of a monotonous loss reduction with respect to a wavelength is easily obtained. When a wavelength multiplexed signal light enters the inclination correction gain equalizer 11 having such a loss wavelength characteristic, an optical spectrum of a light outputted therefrom is like that shown in FIG. 7C, and an uniform optical power is provided for all the channels.

Figure 8A:
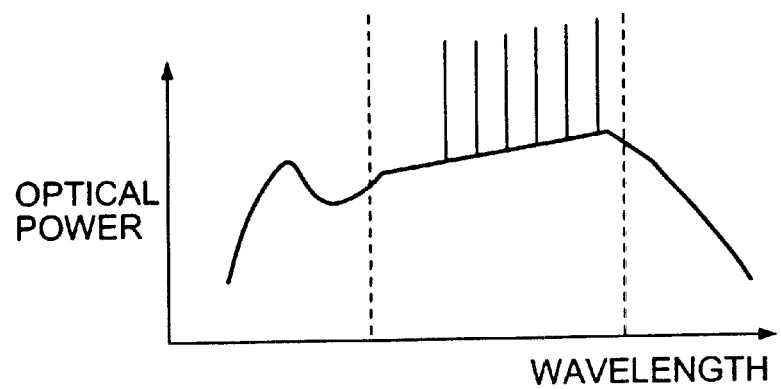
FIGS. 8A, 8B and 8C are respectively an optical spectrum of an inputted signal light when a loss on the optical fiber transmission path is smaller than the design value, a loss characteristic view of the gain equalizer (etalon filter) and an optical spectrum of an outputted light of the gain equalizer.
Figure 8B:
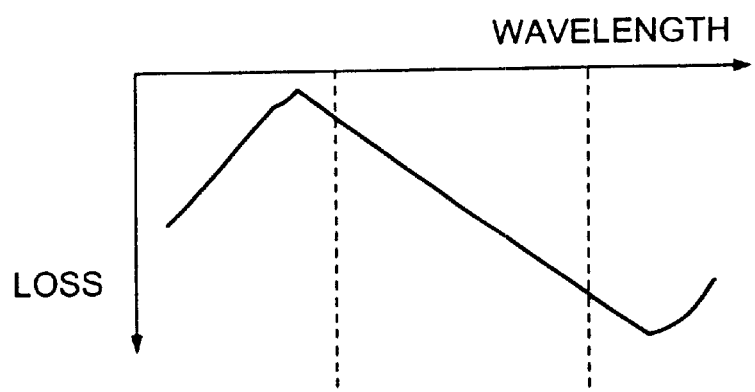
Figure 8C:
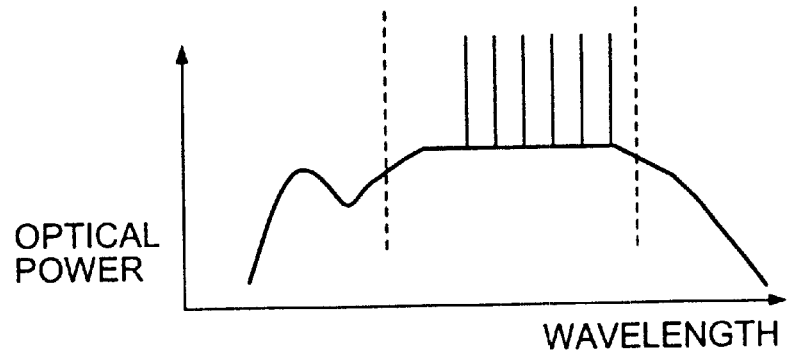

FIGS. 8A, 8B and 8C show states where if a loss on the optical fiber transmission line 91 is smaller than the design value, an uniform optical power is provided for all the channels by the etalon filter.

Figure 9A:
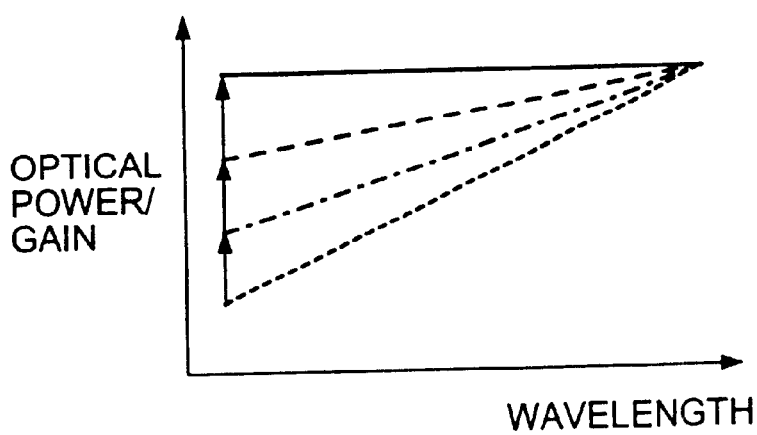
FIGS. 9A, 9B and 9C are graphs respectively showing processes of obtaining flat gains by three gain equalizers.
Figure 9B:
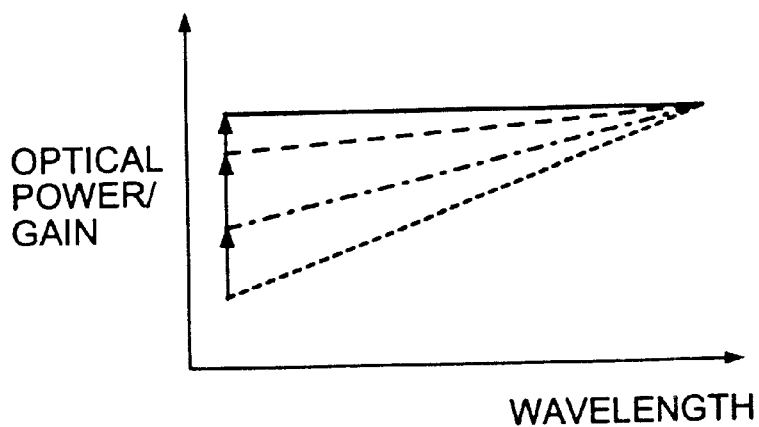
Figure 9C:
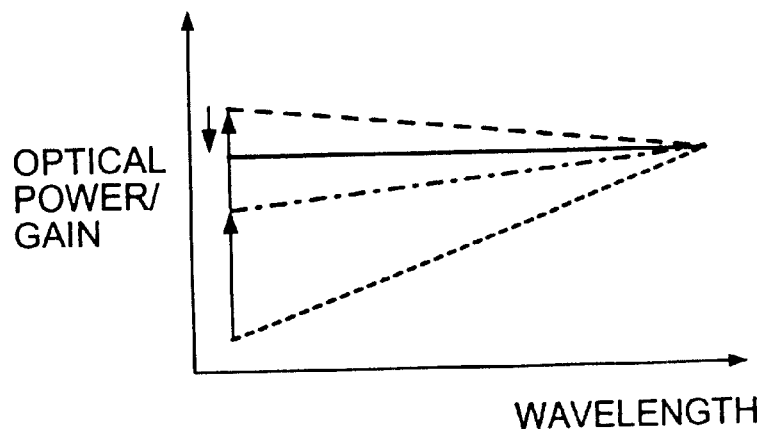

FIGS. 9A, 9B and 9C show states where gains on the optical transmission line (i.e., optical powers of the respective channels) are flat by a plurality of inclination correction gain equalizers. Specifically, FIG. 9A shows a state where three identical inclination correction gain equalizers flatten gain characteristics in a specified position on the optical transmission line. In this position, a straight line a indicates a gain characteristic when no gain equalizers are installed. When one gain equalizer is installed, a gain characteristic is improved to be like that indicated by a straight line b. When two gain equalizers are installed, a gain characteristic is like that indicated by a straight line c. When three gain equalizers are installed, a gain characteristic is flattened to be like that indicated by a straight line d. FIG. 9B shows a state where two gain equalizers having the same inclination and one gain equalizer having a different inclination from the other two gain equalizers flatten gain characteristics. FIG. 9C shows a state where three gain equalizers which include gain equalizers having inclination opposite to one another flatten gain characteristics. For example, when an optical transmission line is to be laid on the sea bottom, gain equalizers having several kinds of inclination are prepared beforehand. In a laying work site, an optical spectrum of a wavelength multiplexed light propagated through the optical transmission line is measured, and a gain equalizer most suited for correcting inclination thereof is installed on the optical transmission line. In this case, for keeping a constant power for the respective channels, one gain equalizer may be enough, or a plurality of gain equalizers may be necessary.

For the inclination correction gain equalizer 11, a fiber grating or an optical band-pass filter can be used instead of the etalon filter. The fiber grating has a characteristic of a largest loss generated in a specified wavelength. Accordingly, for manufacturing a gain equalizer 1 where a loss in a signal wavelength band is monotonously reduced with respect to a wavelength, a wavelength where the maximum loss is generated is set to a shorter wavelength than that in the signal wavelength band. For manufacturing an inclination correction gain equalizer having an opposite characteristic, a wavelength where the maximum loss is generated is set to a longer wavelength than that in the signal wavelength band. The optical band-pass filter has a characteristic of a smallest loss generated in a specified wavelength. Accordingly, for manufacturing a gain equalizer where a loss in a signal wavelength band is monotonously reduced with respect to a wavelength, a wavelength where the minimum loss is generated is set to a longer wavelength than that in the signal wavelength band. For manufacturing a gain equalizer having an opposite characteristic, a wavelength where the minimum loss is generated is set to a shorter wavelength than that in the signal wavelength band.

A signal wavelength is set, for example at an interval of 0.8 nm approximately in a range of 1540 nm to 1565 nm.

While the present invention has been described in connection with certain preferred embodiments, it is to be understood that the subject matter encompassed by the present invention is not limited to those specific embodiments. On the contrary, it is intended to include all alternative modifications, and equivalents as can be included within the spirit and scope of the following claims.

What is claimed is:

1. An optical fiber transmission line comprising:
    at lease one optical repeater, wherein each said optical repeater includes an optical fiber amplifier, and a first optical gain equalizer for equalizing gain characteristics of said optical fiber amplifier in a signal wavelength band; and at least one second optical gain equalizer having a characteristic where a loss on the optical fiber transmission line is monotonously changed in said signal wavelength band.

2. The optical fiber transmission line according to claim 1, wherein said second optical gain equalizer has a characteristic where a loss is monotonously reduced from a short wavelength to a long wavelength in said signal wavelength band.

3. The optical fiber transmission line according to claim 1, wherein said second optical gain equalizer has a characteristic where a loss is monotonously increased from a short length to a long wavelength in said signal wavelength band.

4. The optical fiber transmission line according to claim 1, wherein said second optical gain equalizer includes at least one optical gain equalizer having a characteristic where a loss is monotonously reduced from a short wavelength to a long wavelength in said signal band, and at least one optical gain equalizer having a characteristic where a loss is monotonously increased from a short wavelength to a long wavelength in said signal wavelength band.

5. The optical fiber transmission line according to claim 1, wherein said second optical gain equalizer includes an optical etalon filter.

6. The optical fiber transmission line according to claim 1, wherein said second optical gain equalizer includes an optical band-pass filter.

7. The optical fiber transmission line according to claim 1, wherein said second optical gain equalizer includes an optical fiber grating.

8. An optical wavelength multiplex transmission system comprising:

an optical transmission equipment for wavelength-multiplexing signal lights and transmitting a wavelength-multiplexed signal light;

an optical receiving equipment for receiving said wavelength-multiplexed signal light by wavelength-demultiplexing the same;

an optical fiber transmission line installed between said optical transmission equipment and said optical receiving equipment and including an optical amplification repeater for amplifying a signal light, wherein said optical repeater includes an optical fiber amplifier, and a first optical gain equalizer for equalizing gain characteristics of said optical fiber amplifier in a signal wavelength band; and a second optical gain equalizer arranged on said optical fiber transmission line and having a characteristic where a loss on said optical fiber transmission line is monotonously changed in said signal wavelength band.

* * * * *